United States Patent
Kropveld

(10) Patent No.: US 8,827,090 B2
(45) Date of Patent: Sep. 9, 2014

(54) THREE-DIMENSIONAL STORAGE SYSTEM

(75) Inventor: Ronald Kropveld, Holland, MI (US)

(73) Assignee: Holland Storage Systems LLC, Zeeland, MI (US)

( * ) Notice: Subject to any disclaimer, the term of this patent is extended or adjusted under 35 U.S.C. 154(b) by 68 days.

(21) Appl. No.: 13/552,158

(22) Filed: Jul. 18, 2012

(65) Prior Publication Data
US 2013/0020272 A1 Jan. 24, 2013

Related U.S. Application Data

(60) Provisional application No. 61/572,555, filed on Jul. 18, 2011.

(51) Int. Cl.
| | | |
|---|---|---|
| *A47F 5/08* | (2006.01) | |
| *A47F 7/16* | (2006.01) | |
| *A47B 43/00* | (2006.01) | |
| *A47B 47/00* | (2006.01) | |
| *A47B 57/00* | (2006.01) | |
| *B65G 1/02* | (2006.01) | |
| *A47B 61/02* | (2006.01) | |
| *B65G 1/04* | (2006.01) | |
| *A47F 5/00* | (2006.01) | |

(52) U.S. Cl.
CPC .............. *B65G 1/026* (2013.01); *A47B 61/02* (2013.01); *B65G 1/0457* (2013.01); *A47F 5/0892* (2013.01); *A47F 5/0807* (2013.01); *A47B 43/003* (2013.01); *A47F 5/0093* (2013.01)
USPC ............. 211/113; 211/118; 211/195; 211/46; 211/192

(58) Field of Classification Search
CPC ............ B65G 1/026; B65G 1/00; B65G 1/02; B65G 1/0457; B65G 1/10; A47G 25/54; A47B 55/00; A47B 47/028; A47B 57/00; A47B 53/00; A47B 57/58; A47B 57/583; A47B 57/585; A47B 57/586; A47B 61/02; A47B 96/025; A47B 43/00; A47B 43/003; A47B 43/006; A47B 87/00; A47B 96/00; A47B 96/027; A47B 96/06; A47B 96/061; A47F 7/30; A47F 7/08; A47F 5/0018; A47F 5/08; A47F 5/0807; A47F 5/0876; A47F 5/0892; A47F 5/10; A47F 7/00; A47F 5/0081; A47F 5/0093; B65D 7/12; B65D 7/14; B65D 33/14; B65D 19/0002; D06F 57/12; B42F 15/007; B42F 15/063; Y10S 206/806
USPC ........ 211/117, 118, 85.3, 113, 191, 189, 162, 211/192, 195, 45, 46; 108/149, 180, 59, 60; 312/184, 183, 193, 201, 131, 132, 3–6, 312/258, 265.1, 265.4, 351, 297; 206/386, 206/583, 600
See application file for complete search history.

(56) References Cited

U.S. PATENT DOCUMENTS

| | | | |
|---|---|---|---|
| 865,268 A * | 9/1907 | Powell | 211/27 |
| 2,921,688 A * | 1/1960 | Riemenschneider | 108/16 |

(Continued)

OTHER PUBLICATIONS

Prior art shelving system disclosed before the date of conception of the present invention. The prior art shelving system includes 1 page of description and 15 drawing figures. (16 pages).

(Continued)

*Primary Examiner* — Jennifer E Novosad
(74) *Attorney, Agent, or Firm* — Flynn, Thiel, Boutell & Tanis, P.C.

(57) ABSTRACT

A track shelving system comprising a frame having vertical posts and horizontal beams extending between the posts, a support assembly comprising brackets connected to the beams and tracks, with each of the tracks being connected to at least two of the brackets, and a shelving assembly comprising a pair of vertical walls, a top wall, and horizontal shelves removably attached to the vertical walls. Each of the horizontal shelves is able to be positioned in a plurality of vertical positions to the vertical walls. The top wall is connected to top edges of the vertical walls. The shelving assembly includes a pair of rods connected to the top wall by straps. The pair of rods are configured to be moved along the tracks to allow the shelving assembly to be moved to a selected horizontal position.

32 Claims, 17 Drawing Sheets

(56) References Cited

U.S. PATENT DOCUMENTS

| | | | | |
|---|---|---|---|---|
| 3,519,140 | A | * | 7/1970 | Wellman, Jr. .................. 211/162 |
| 3,923,161 | A | * | 12/1975 | Kaiser et al. .................. 211/117 |
| 4,595,106 | A | * | 6/1986 | Kunze et al. .................. 211/118 |
| 4,979,705 | A | * | 12/1990 | Bovitz ............................ 248/97 |
| 5,076,442 | A | * | 12/1991 | Hakeem .......................... 211/34 |
| 5,601,016 | A | * | 2/1997 | Witte ............................ 108/106 |
| 5,749,479 | A | * | 5/1998 | Belokin et al. ................ 211/113 |
| 6,036,286 | A | * | 3/2000 | Krumholz .................... 312/198 |
| 6,296,133 | B1 | * | 10/2001 | Cobane ............................ 220/6 |
| 6,484,893 | B1 | * | 11/2002 | Tkatch ....................... 211/94.02 |
| 6,564,951 | B2 | * | 5/2003 | Hatami ......................... 211/162 |
| 6,601,928 | B1 | * | 8/2003 | Kortman et al. .................. 312/3 |
| 6,719,157 | B2 | * | 4/2004 | Stoddart et al. ............... 211/118 |
| 7,258,232 | B2 | * | 8/2007 | Bradford et al. .............. 206/386 |
| 7,413,091 | B2 | * | 8/2008 | Krull ............................. 211/162 |
| 7,484,465 | B2 | * | 2/2009 | Laby ............................. 108/180 |
| 7,641,063 | B2 | * | 1/2010 | Wishart et al. ............... 211/189 |
| 7,810,655 | B2 | * | 10/2010 | Wang ............................ 211/118 |
| 8,459,475 | B2 | * | 6/2013 | Higueroa et al. ............. 211/162 |
| 8,540,089 | B2 | * | 9/2013 | Wang ............................ 211/118 |
| 2003/0111434 | A1 | * | 6/2003 | Stoddart et al. .............. 211/118 |
| 2004/0089623 | A1 | * | 5/2004 | Harrell ......................... 211/113 |
| 2004/0178155 | A1 | * | 9/2004 | Brownfield et al. ............ 211/36 |
| 2007/0090062 | A1 | * | 4/2007 | Girault et al. .................... 211/36 |
| 2008/0116160 | A1 | * | 5/2008 | McNicholas ................. 211/118 |
| 2010/0133217 | A1 | * | 6/2010 | Wang ............................ 211/118 |
| 2010/0276241 | A1 | * | 11/2010 | Malone ............................ 190/9 |
| 2011/0163053 | A1 | * | 7/2011 | Benneche et al. ......... 211/86.01 |

OTHER PUBLICATIONS

IKEA Garnityr Storage System publically disclosed before invention of presently claimed invention (4 pages).

IKEA Skubb Organizer—6 Compartments publically disclosed before invention of presently claimed invention (3 pages).

IKEA Skubb Organizer—9 Compartments publically disclosed before invention of presently claimed invention (3 pages).

IKEA Jäll Organizer publically disclosed before invention of presently claimed invention (3 pages).

IKEA Garnityr Organizer—7 Compartments publically disclosed before invention of presently claimed invention (3 pages).

Bed, Bath & Beyond Real Simple 6-Shelf Sweater Organizer publically disclosed before invention of presently claimed invention (1 page).

* cited by examiner

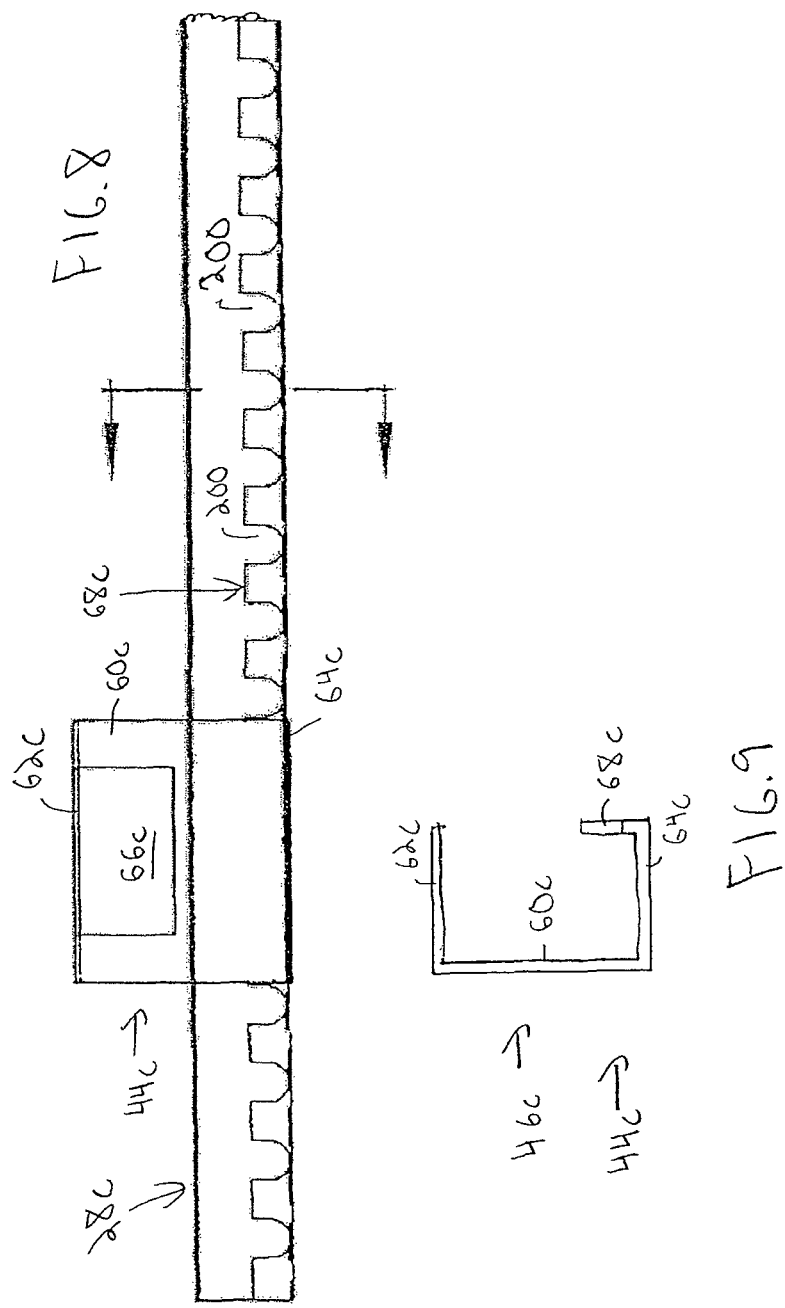

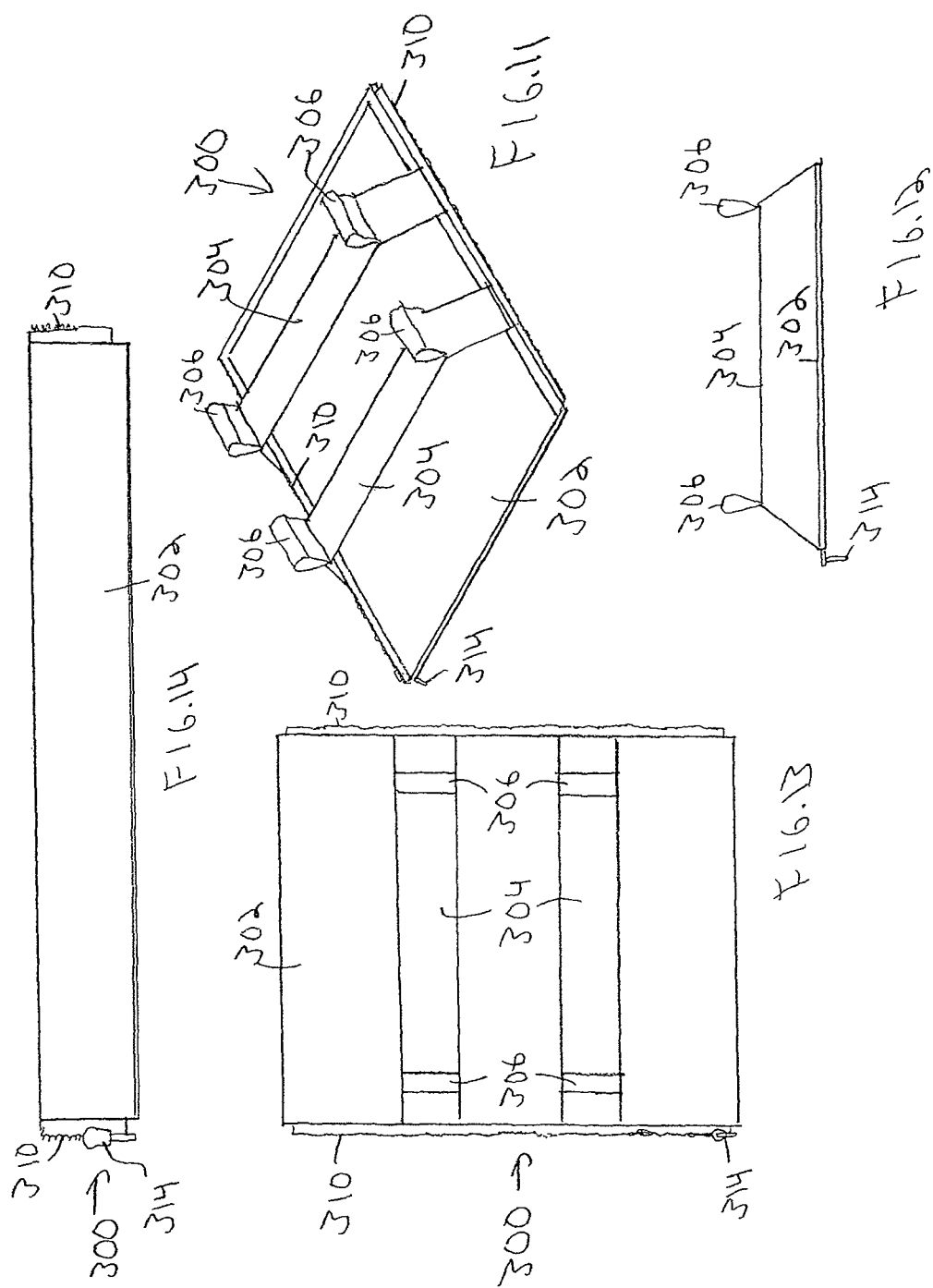

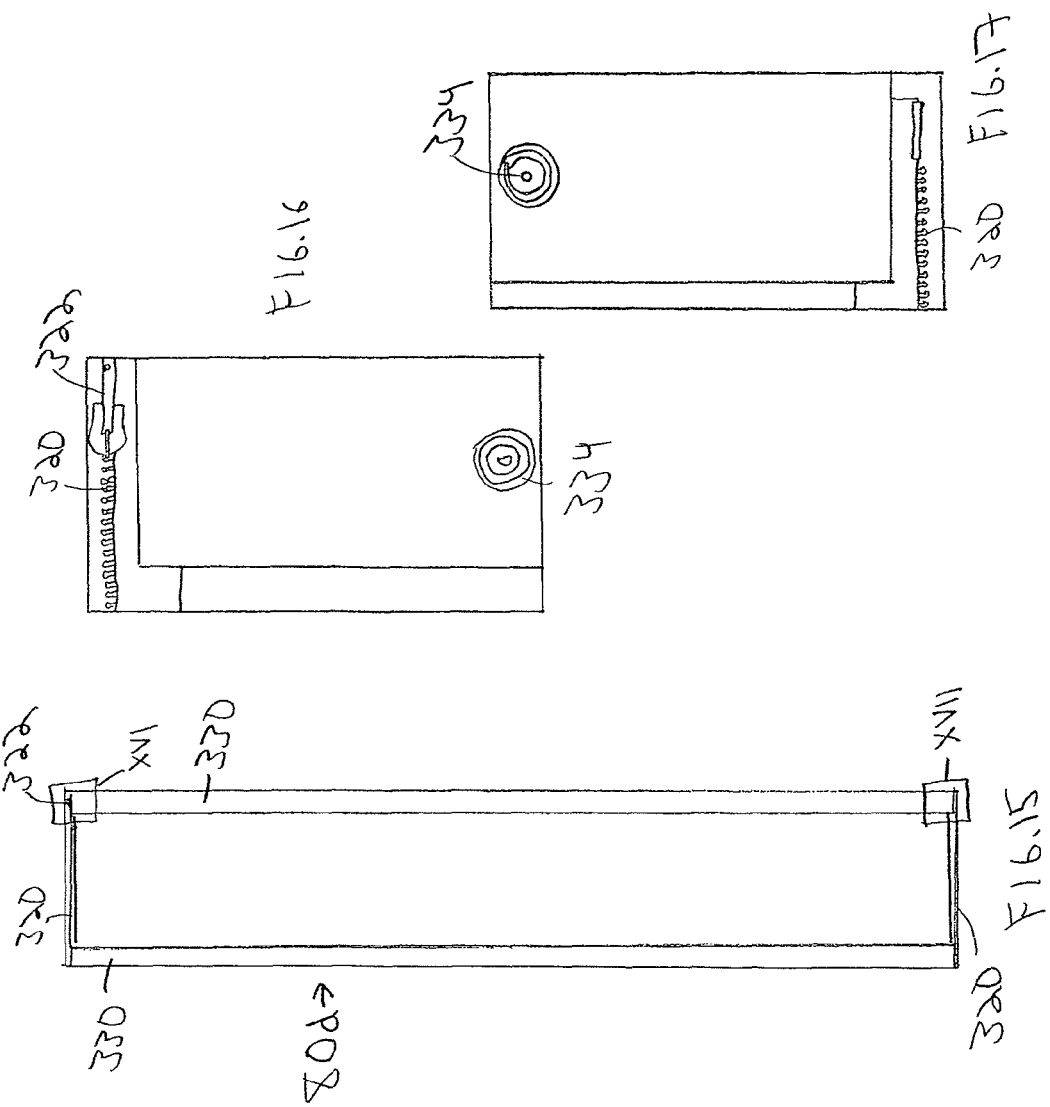

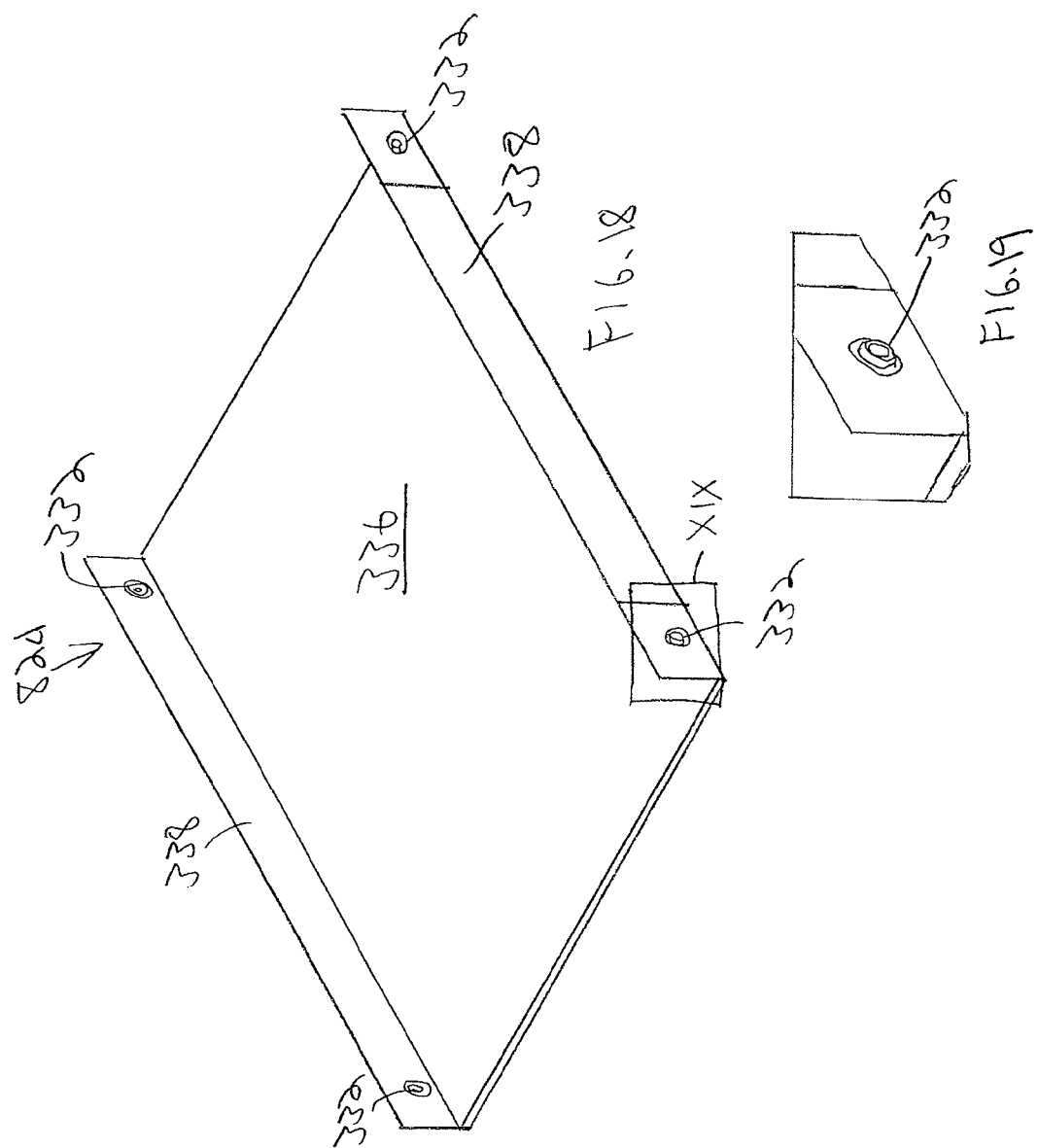

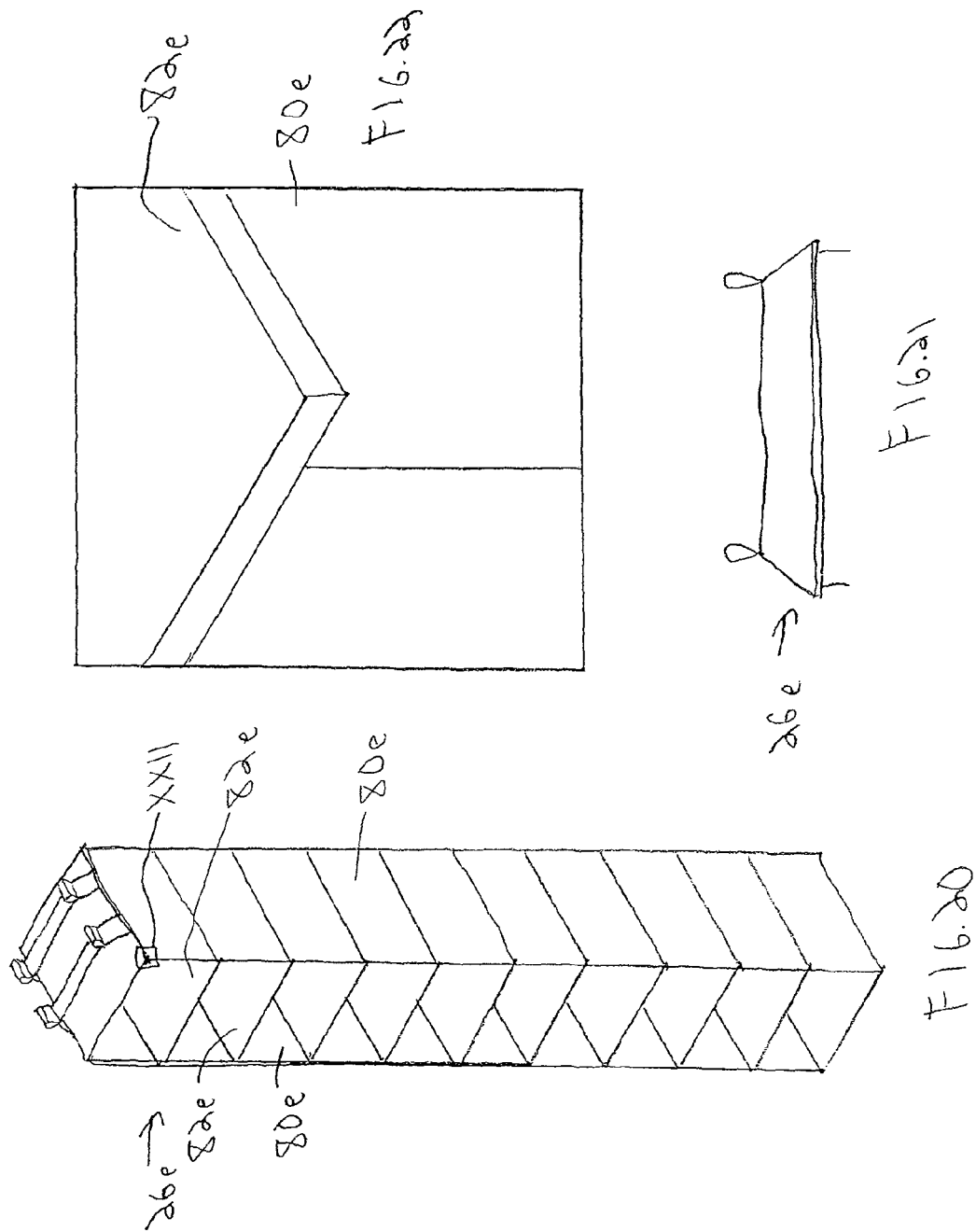

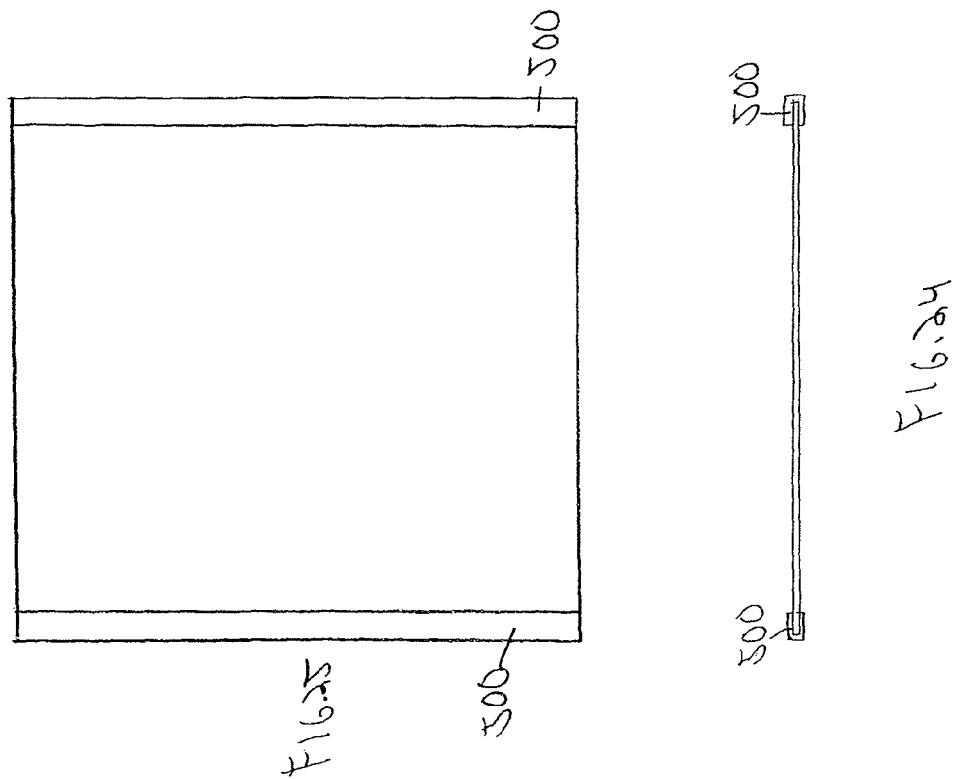
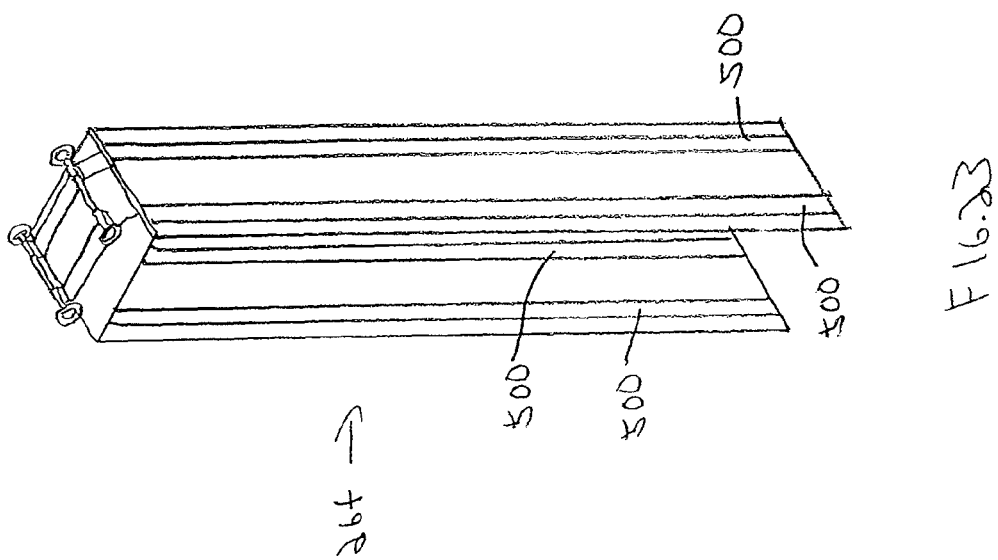

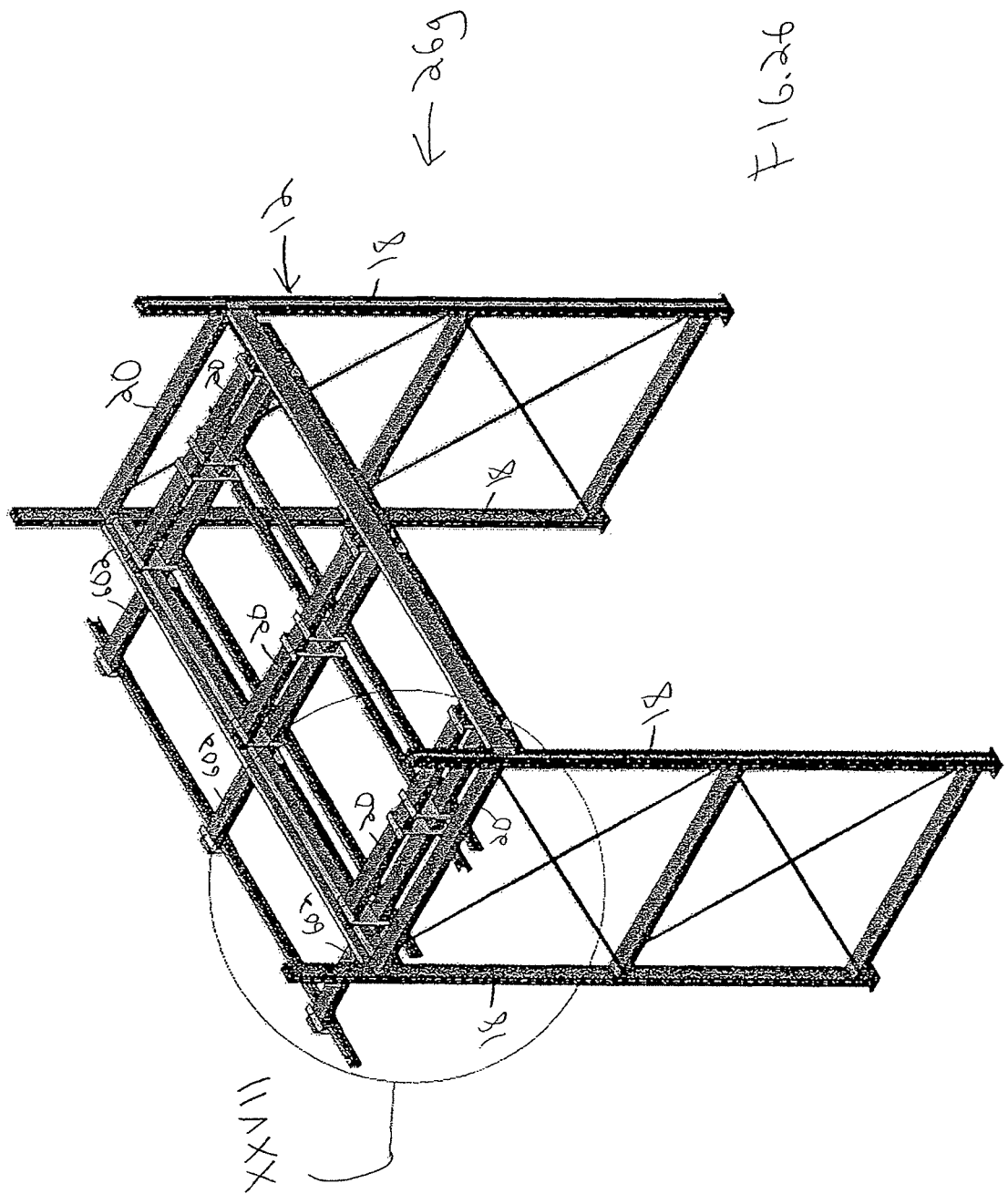

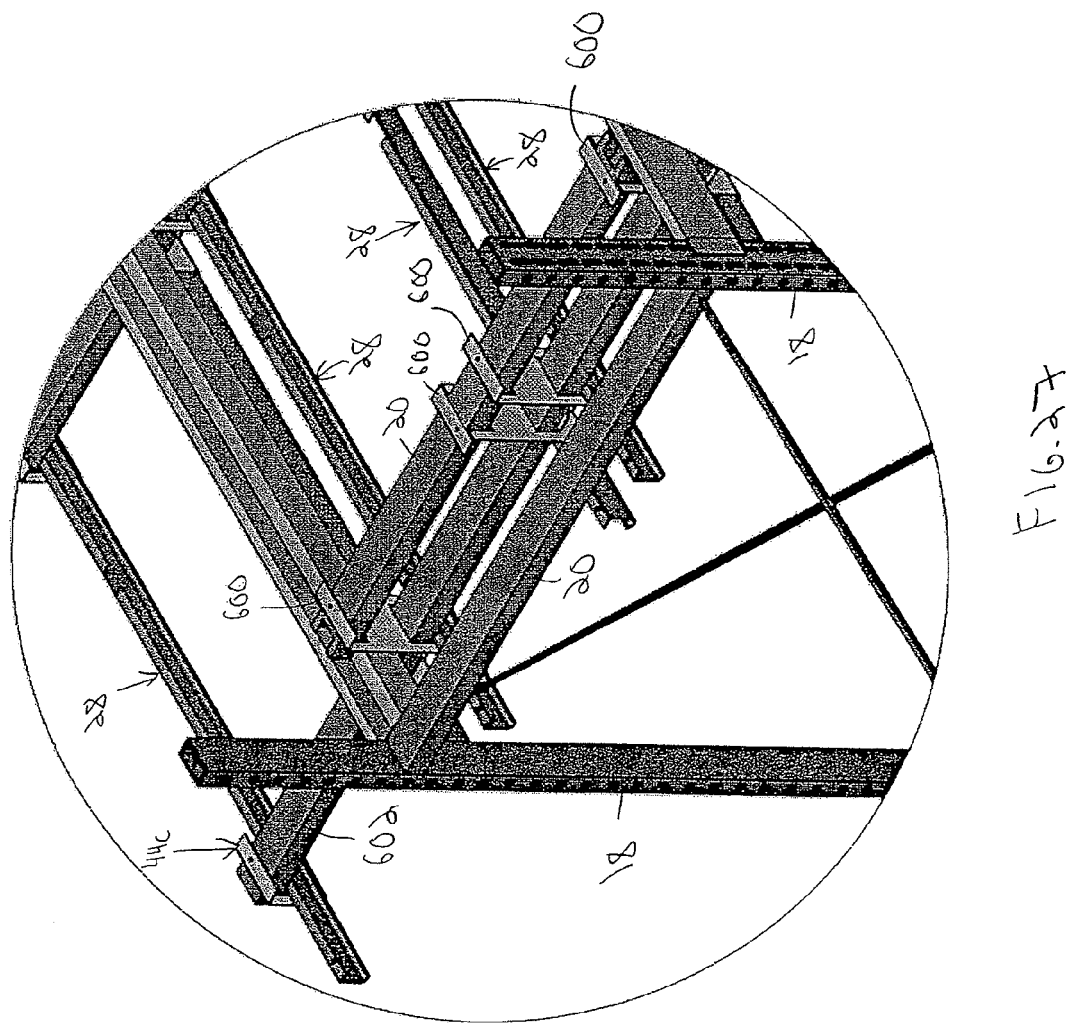

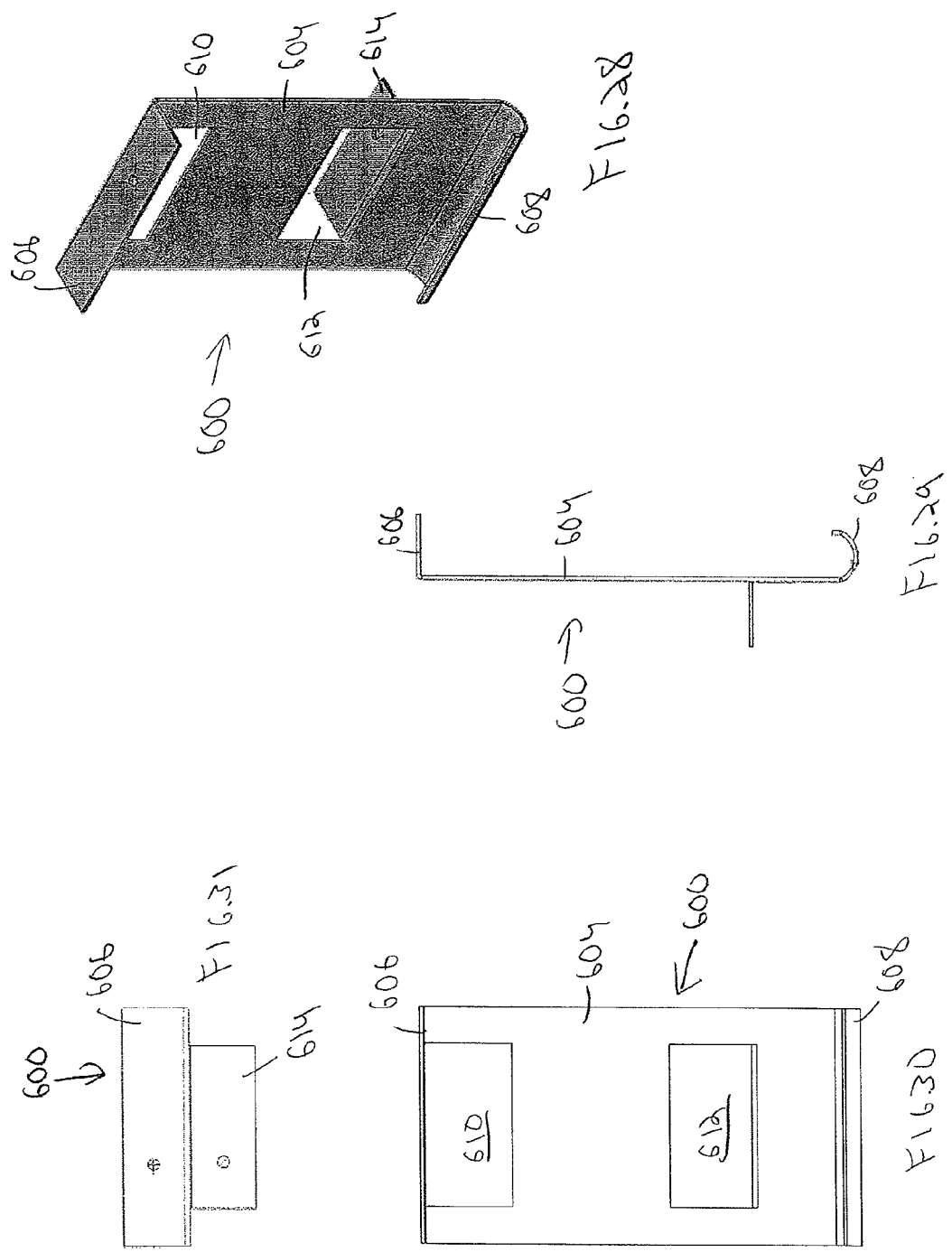

US 8,827,090 B2

THREE-DIMENSIONAL STORAGE SYSTEM

CROSS-REFERENCE TO RELATED APPLICATIONS

This application claims priority to U.S. Provisional Patent Application No. 61/572,555, filed Jul. 18, 2011, the disclosure of which is hereby incorporated by reference in its entirety.

BACKGROUND OF THE INVENTION

Warehouses are facing an extended assortment and diversity of products, with more orders for small units. Typically, all of this has to be organized out of the same warehouse. An important part of warehousing goods is picking of products for sale, which generally is done manually, because the products, due to their sizes, need to be stored at different locations and consquently also need to be retrieved from different locations. This results in a time and labor consuming process of order picking. The costs of order picking can represent 55% of operational warehousing costs.

SUMMARY OF THE INVENTION

An aspect of the present invention is to provide a track shelving system comprising a frame having vertical posts and horizontal beams extending between the posts, a support assembly comprising brackets connected to the beams and tracks, with each of the tracks being connected to at least two of the brackets, and a shelving assembly comprising a pair of vertical walls, a top wall, and horizontal shelves removably attached to the vertical walls. Each of the horizontal shelves is able to be positioned in a plurality of vertical positions to the vertical walls. The top wall is connected to top edges of the vertical walls. The shelving assembly includes a pair of rods connected to the top wall by straps. The pair of rods are configured to be moved along the tracks to allow the shelving assembly to be moved to a selected horizontal position.

BRIEF DESCRIPTION OF DRAWINGS

FIG. 8 is a side view of a connection assemblage and track of the three-dimensional storage system of FIG. 7.

FIG. 9 is a front view of the connection assemblage of the three-dimensional storage system of FIG. 7.

FIG. 11 is a perspective view of a top of the second embodiment for the compartment assembly of the present invention.

FIG. 12 is a front view of the top of the second embodiment for the compartment assembly of the present invention.

FIG. 13 is a top view of the top of the second embodiment for the compartment assembly of the present invention.

FIG. 14 is a close-up top sectional view of the top of the second embodiment for the compartment assembly of the present invention.

FIG. 15 is a side view of a side wall of the second embodiment for the compartment assembly of the present invention.

FIG. 16 is a close-up top corner side view of the side wall of the second embodiment for the compartment assembly of the present invention shown in box XVI of FIG. 15.

FIG. 17 is a close-up bottom corner side view of the side wall of the second embodiment for the compartment assembly of the present invention shown in box XVII of FIG. 15.

FIG. 18 is a perspective view of a shelf of the second embodiment for the compartment assembly of the present invention.

FIG. 19 is a close-up perspective view of the shelf of the second embodiment for the compartment assembly of the present invention shown in box XIX of FIG. 18.

FIG. 20 is a perspective view of a third embodiment for the compartment assembly of the present invention.

FIG. 21 is an upper sectional side view of the third embodiment for the compartment assembly of the present invention.

FIG. 22 is a close-up perspective view of the third embodiment for the compartment assembly of the present invention shown in box XXII of FIG. 20.

FIG. 23 is a perspective view of a fourth embodiment for the compartment assembly of the present invention.

FIG. 24 is a side view of a shelf of the fourth embodiment for the compartment assembly of the present invention.

FIG. 25 is a top view of a shelf of the fourth embodiment for the compartment assembly of the present invention.

FIG. 26 is a perspective view of another embodiment of the three-dimensional storage system of the present invention.

FIG. 27 is a perspective view of the three-dimensional storage system of the present invention shown in circle XXVII of FIG. 26.

FIG. 28 is a perspective view of a bracket of the three-dimensional storage system of the present invention as illustrated in FIG. 26.

FIG. 29 is a side view of a bracket of the three-dimensional storage system of the present invention as illustrated in FIG. 26.

FIG. 30 is a front view of a bracket of the three-dimensional storage system of the present invention as illustrated in FIG. 26.

FIG. 31 is a top view of a bracket of the three-dimensional storage system of the present invention as illustrated in FIG. 26.

DETAILED DESCRIPTION OF PREFERRED EMBODIMENTS

Figure 1:
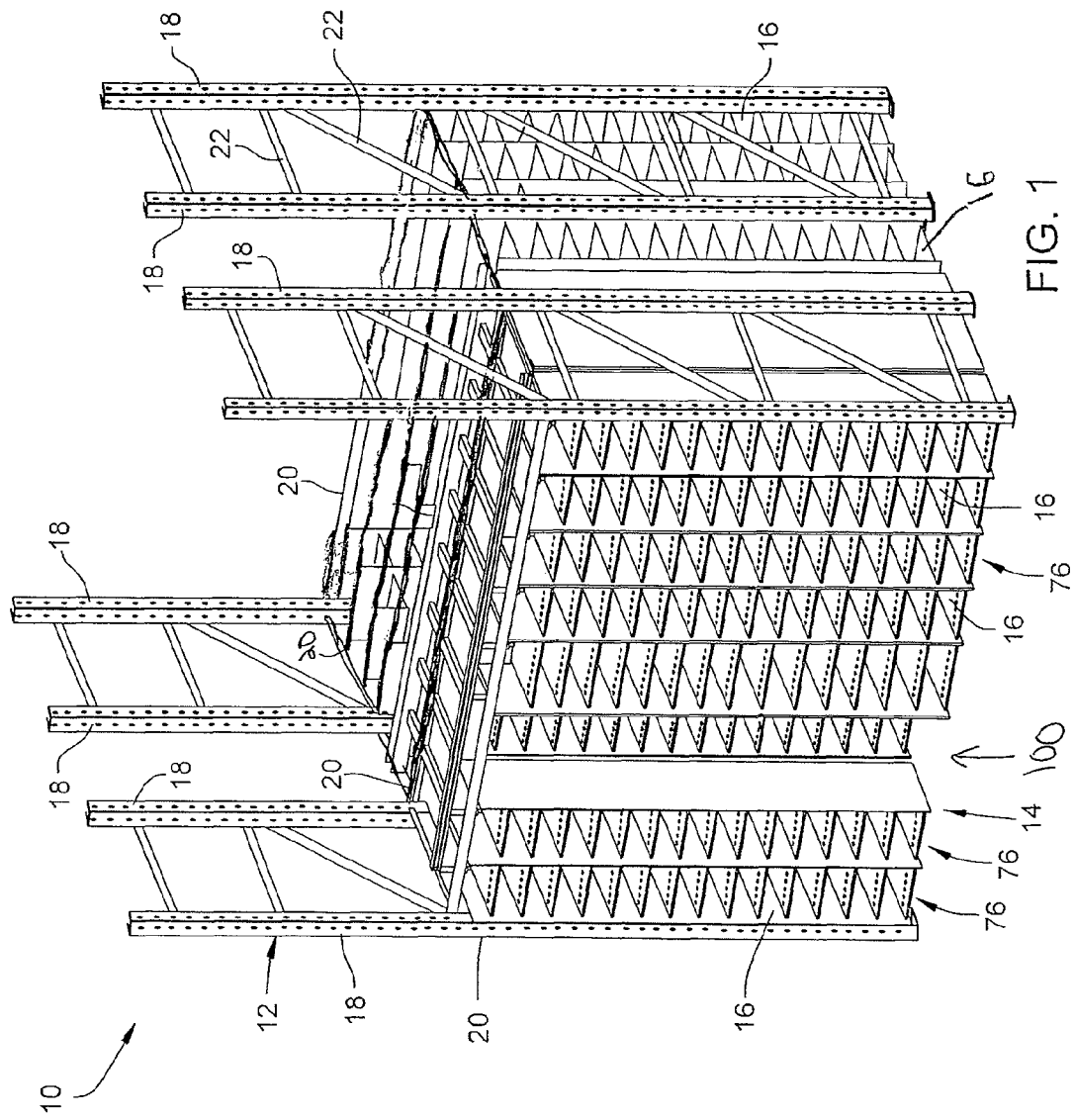
FIG. 1 is a perspective view of a three-dimensional storage system of the present invention.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined herein. Hence, specific dimensions and other physical characteristics relating to the embodiments disclosed herein are not to be considered as limiting, unless expressly stated otherwise.

The reference number 10 (FIG. 1) generally designates a three-dimensional storage system embodying the present invention. In the illustrated example, the three-dimensional storage system 10 comprises a frame 12 and a compartment module system 14. The frame supports the compartment module system 14 above a floor and allows each access to individual compartments 16 within the compartment module system 14.

Figure 2:
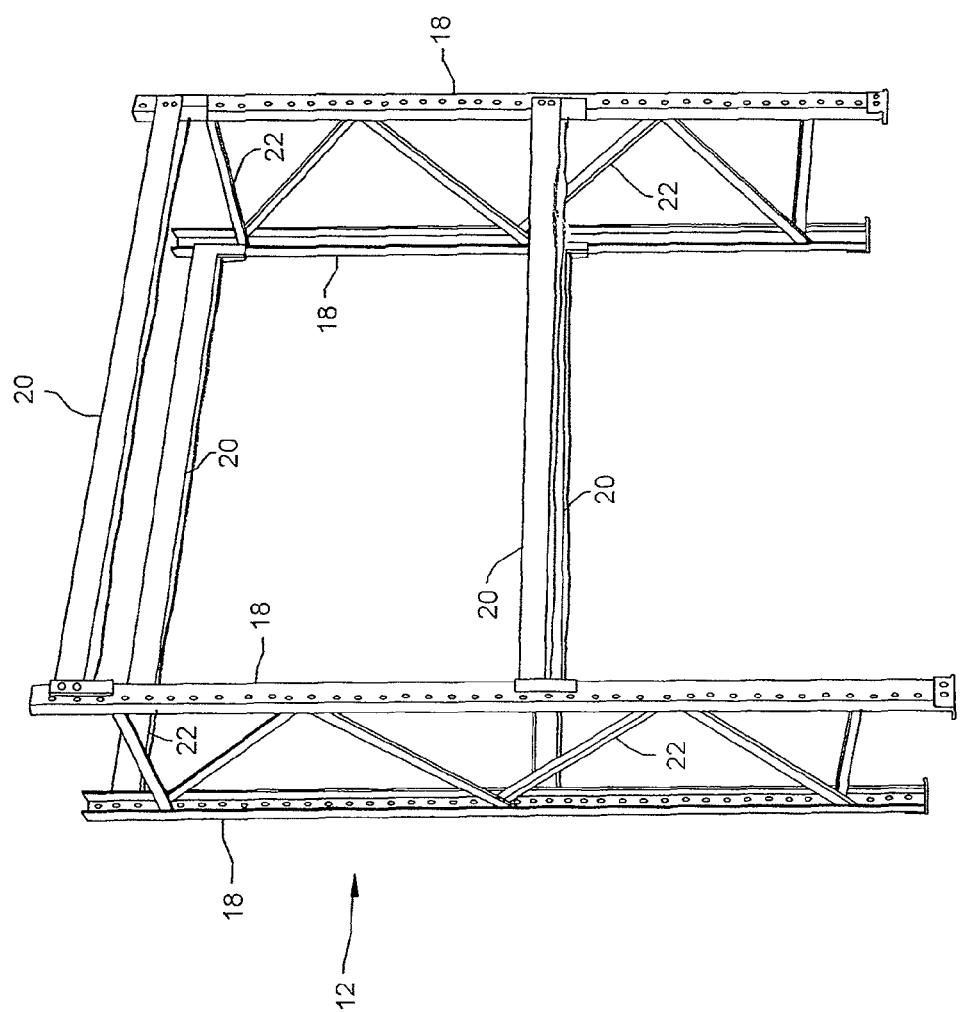
FIG. 2 is a perspective view of a frame of the three-dimensional storage system of the present invention.

In the illustrated example, the frame 12 (FIGS. 1 and 2) supports the compartment module system 14. The frame 12 can comprise an existing frame 12 located within a building (e.g., warehouse) or can be a frame 12 specifically designed to support the compartment module system 14. The typical preexisting frame 12 includes a plurality of vertically orientated posts 18 extending upwardly from the ground. The posts 18 form corners of a rectangle when viewed from above. A pair of horizontal cross beams 20 extend between tops of the posts 18 at a front and at a rear of the frame 12 and a plurality of struts 22 extend between the posts 18 at sides of the frame 12. The struts 22 can be angled between the posts 18 or horizontally positioned. It is contemplated that the posts 18, the cross beams 20 and the struts 22 can have any cross-sectional shape (e.g., L-shaped, U-shaped or rectangular). While not shown, it is contemplated that the frame 12 can comprise walls and/or the ceiling of an area (e.g., warehouse). The frame 12 supports the compartment module system 14 above the floor.

The illustrated compartment module system 14 includes the compartments 16 for storage of goods therein. The compartment module system 14 comprises a support assembly 24 and a compartment assembly 26, with the support assembly 24 connecting the compartment assembly 26 to the frame 12. The support assembly 24 (FIGS. 3-5) includes at least one pair of tracks 28 connected to the frame. It is contemplated that the frame 12 could have the tracks 28 rigidly connected thereto or the tracks 28 could be removably connected to the frame 12 using a hook system 30.

In the illustrated example, the hook system 30 connects the tracks 28 of the support assembly 24 to the frame 12 for allowing the compartment module system 14 to be connected to a preexisting frame 12. The hook system 30 includes track support bars 32 and a plurality of hooks 34. The track support bars 32 extend substantially parallel to the struts 22 of the frame 12 and perpendicular to the cross beams 20 of the frame 12. The track support bars 32 have the hooks 34 connected thereto.

Figure 3:
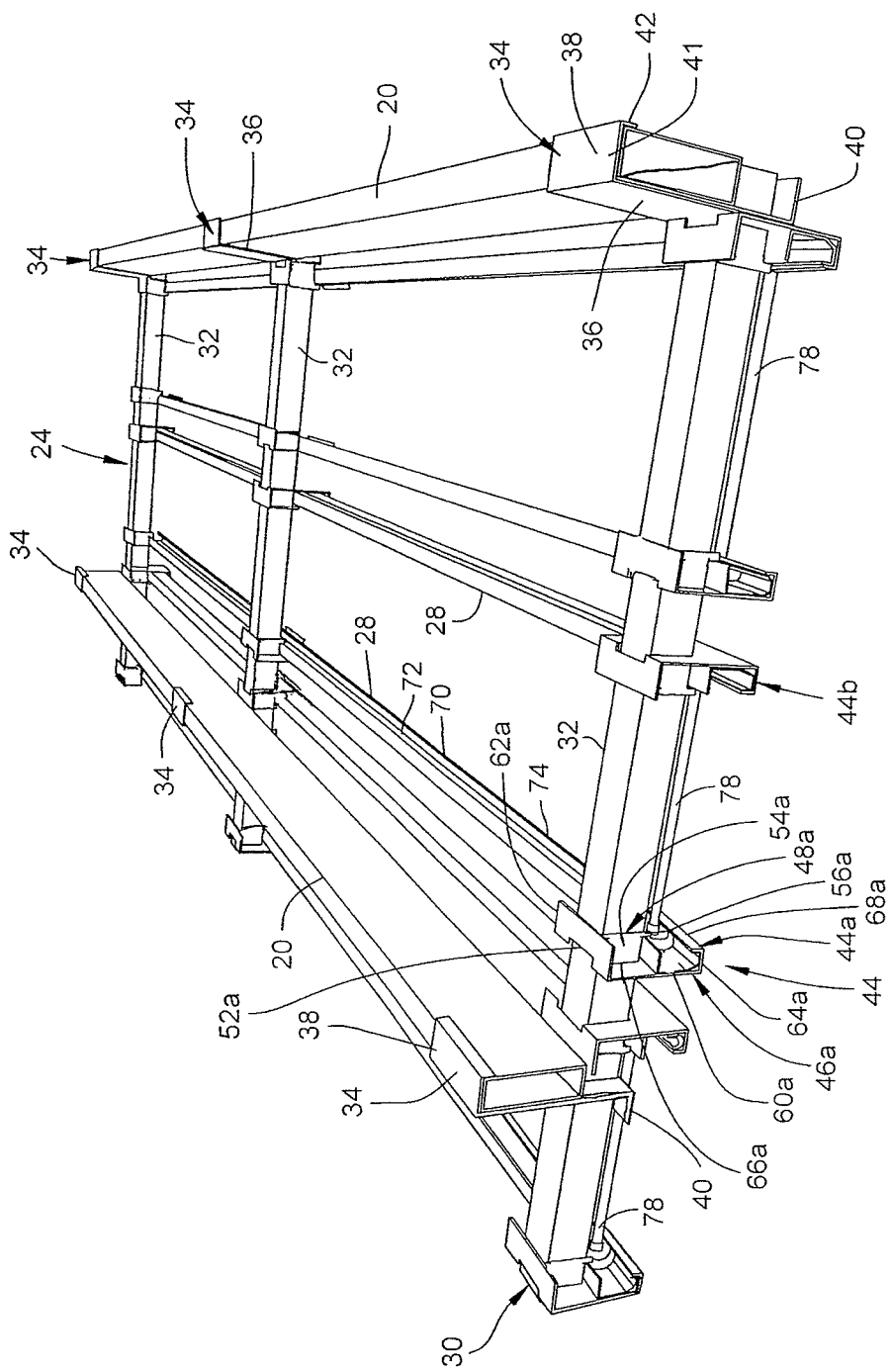
FIG. 3 is a first partial top perspective view of a portion of the frame and a compartment module system of the three-dimensional storage system of the present invention.
Figure 4:
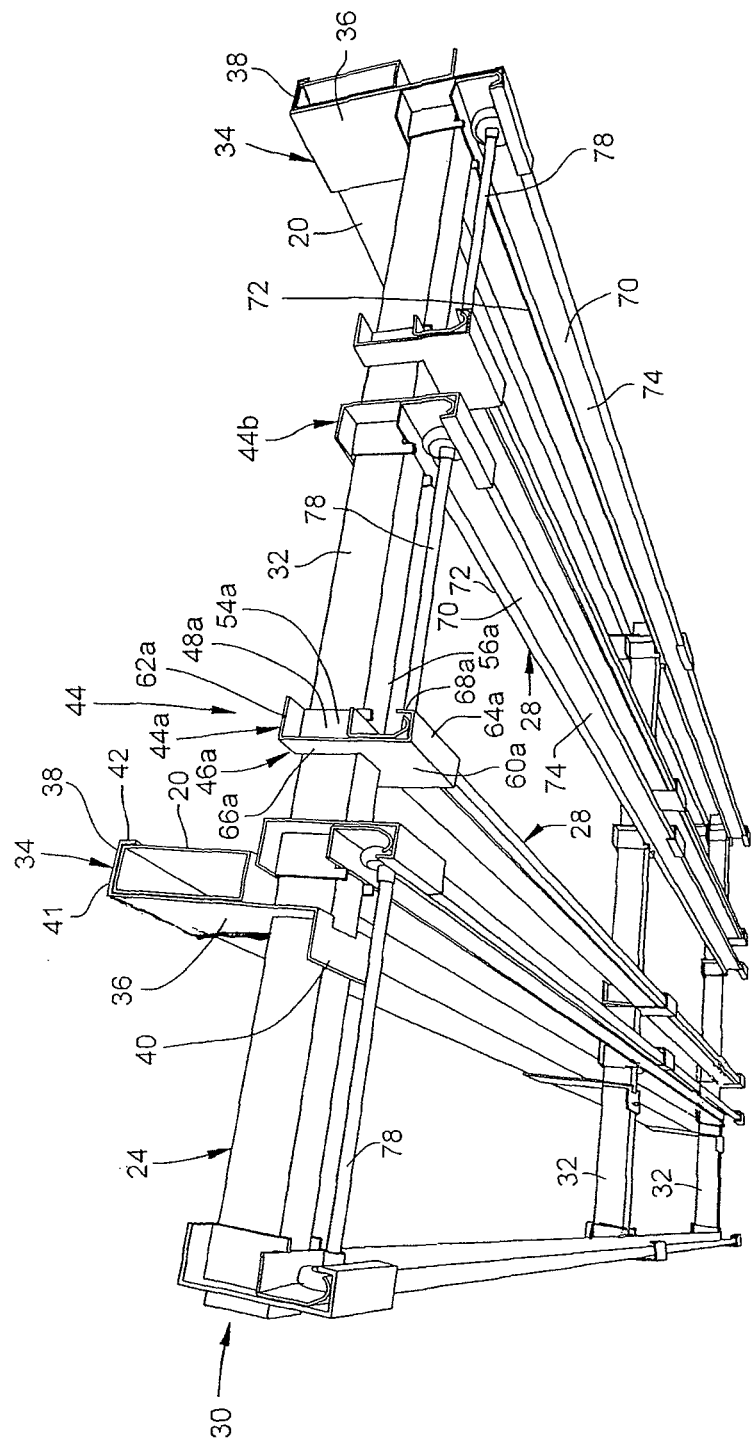
FIG. 4 is a partial bottom perspective view of a portion of the frame and a compartment module system of the three-dimensional storage system of the present invention.

The illustrated hooks 34 are configured to hook over a top surface of the cross beams 20 of the frame 12, with a top of the track support bars 32 being located below a bottom of the cross beams 20. The hooks 34 include a main plate 36 that is vertically orientated, a top L-shaped portion 38 and a bottom lip 40. The top L-shaped portion 38 includes a longer plate 41 and a perpendicular shorter plate 42. As illustrated in FIGS. 3 and 4, the longer plate 41 is connected to a top of the main plate 36 and abuts the top of the cross beam 20 and the shorter plate 42 abutting a side face of the cross beam 20. The cross beam 20 of the frame 12 is captured between the shorter plate 42 of the top L-shaped portion 38 of the hook 34 and the main plate 36. The track support bars 32 extend through an opening at a bottom of the main plate 36 of the hook 34 and rest on the bottom lip 40 of the hook 34. While three track support bars 32 each having three hooks 34 connected thereto are illustrated, it is contemplated that two or more track support bars 32 could be used and that each track support bar 32 can have two or more hooks 34 connected thereto. Furthermore, while the track support bars 32 are illustrated as having a rectangular cross section, it is contemplated that the track support bars 32 could have any cross-sectional shape (e.g., L-shaped, U-shaped or rectangular).

In the illustrated example, the tracks 28 are connected to the hook system 30 in pairs of the tracks 28 via connection assemblies 44. Each connection assembly 44 includes left hand connection assemblage 44a and a right hand connection assemblage 44b (as viewed in FIGS. 3 and 4). The left hand connection assemblage 44a is a mirror image of the right hand connection assemblage 44b, such that only the left hand connection assemblage 44a will be discussed herein. The left hand connection assemblage 44a includes a left hand C-shaped holding member 46a and a left hand locator member 48a. The left hand locator member 48a has an inverted U-shape including a top section 52a and a pair of side sections 54a. The top section 52a rests on a top of the track support bar 32. Bottoms of the side section 54a include a downwardly extending tab 56a at a right side thereof. As explained in more detail below, the tab 56a helps to maintain the track 28 in position. The left hand C-shaped holding member 46a includes a side panel 60a, a top panel 62a and a bottom panel 64a. The top panel 62a rests on top of the top section 52a of the left hand locator member 48a. The side panel 60a has an opening 66a therein, with the track support bar 32 extending through the opening 66a. The bottom panel 64a extends to the right from a bottom of the side panel 60a. The bottom panel 64a includes an upwardly extending lip 68a at an end thereof for maintaining the track 28 in position.

The illustrated tracks 28 support the compartment assembly 26. Each track 28 is grouped in a pair of left hand tracks 28 and right hand tracks 28, with the left hand tracks 28 being a mirror image of the right hand tracks 28. Each track 28 includes a J-shaped bottom portion 70 and a top horizontal portion 72 to define a receiving area 74 therebetween. The receiving area 74 of the left hand track 28 faces the receiving area 74 of the right hand track 28. As illustrated in FIGS. 3 and 4, a bottom of the J-shaped bottom portion 70 of each track rests on the bottom panel 64 of the C-shaped holding member 46, with the lip 68 preventing movement of a bottom of the track 28. The end of the top horizontal portion 72 of the track 28 abuts against the tab 56 of the locator member 48 to prevent movement of the top of the track 28. Therefore, the track 28 is maintained in position. In the illustrated example, three connection assemblies 44 hold each track 28. However, it is contemplated that any number of connection assemblies 44 could hold each track 28. Furthermore, while a specific support assembly 24 is discussed above, it is contemplated that other support assemblies could be used to connect the tracks 28 to the cross beams 20 (e.g., a one piece molded system). Each track 28 supports a compartment module 76 of the compartment module system 14 using a pair of roller bars 78 that are configured to roll or slide along the tracks 28. While the roller bars 78 are shown as including wheels for rolling, it is contemplated that the roller bars 78 could include slide blocks or other slidable members for sliding along the tracks 28. While three pairs of tracks 28 are illustrated in the drawings, it is contemplated that any number of pairs of tracks 28 would be used, depending on the desired length or width of the compartments 16.

Figure 6:
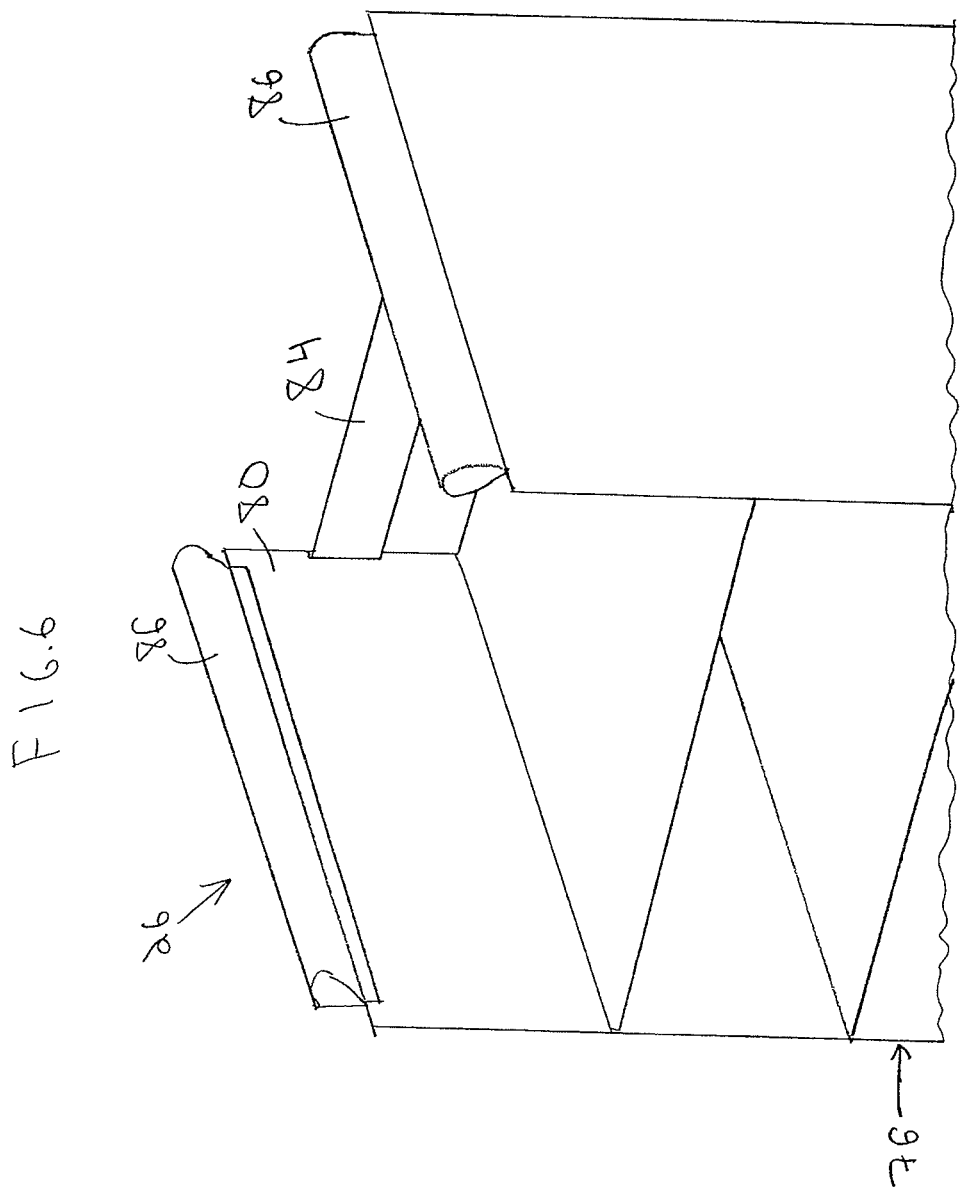
FIG. 6 is a partial perspective view of a compartment assembly of the three-dimensional storage system of the present invention.

In the illustrated example, each compartment module 76 (FIG. 6) of the compartment module system 14 includes a plurality of the compartments 16 for storage of products. Each compartment module 76 includes a pair of side walls 80, a plurality of floors 82, a plurality of backstops 84 and a pair of top connection members 86. Each floor 82 extends between the pair of side walls 80 and defines one of the compartments 16. One of the backstops 84 is located at the rear of each compartment 16 and also extends between the pair of side walls 80. However, it is contemplated that the compartment module 76 could not include any backstop 84 or could include a single rear wall covering the rear of each compartment 16. The top connection members 86 are connected to tops of the side walls 80 and form loops for receiving the roller bars 78 therein. The roller bars 78 support the compartment module 76. The side walls 80, the floors 82 and the backstops 84 can be made of a flexible material to allow the side walls 80 to be pushed together when the compartment module 76 does not include any products therein. However, it is contemplated that the compartment modules 76 or any portions thereof could be formed of rigid materials. Furthermore, while each compartment module 76 is shown as having two independent side walls 80, it is contemplated that adjacent compartment modules 76 could share a side wall 80 (i.e., one side wall 80 would form a side wall and be located between two adjacent compartments 16).

Figure 5:
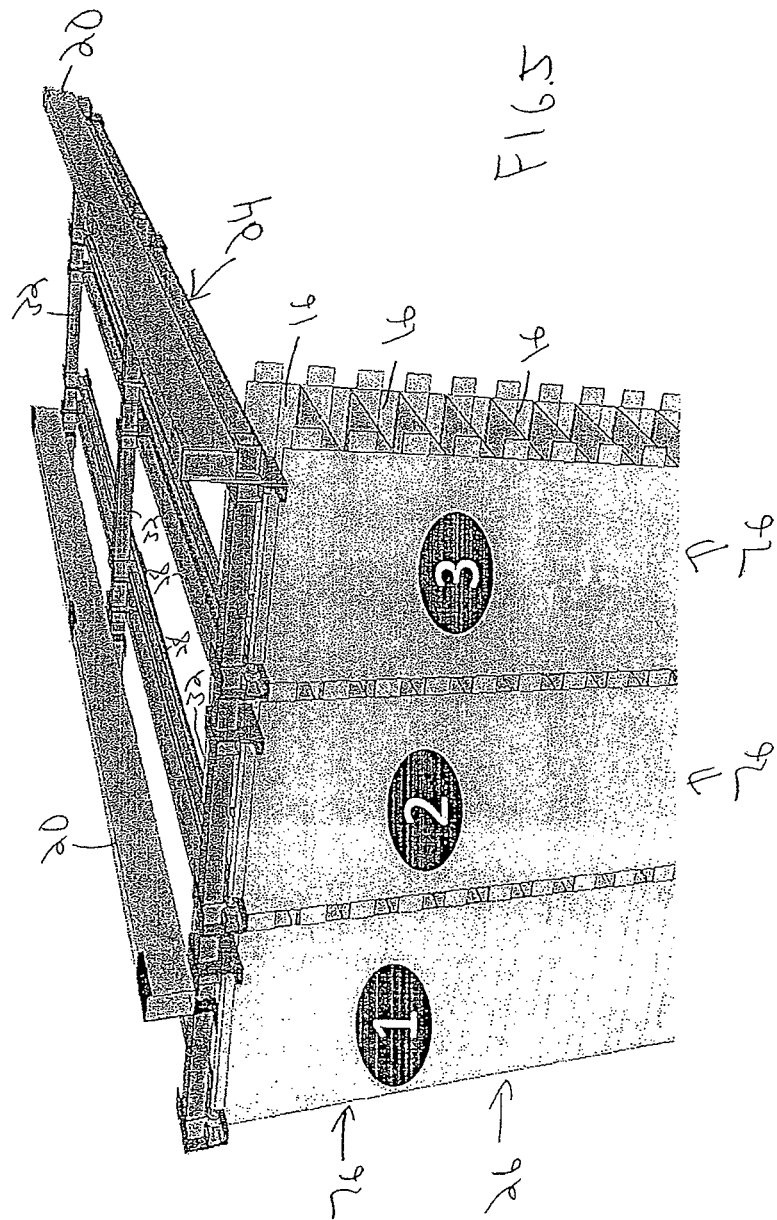
FIG. 5 is a second partial top perspective view of a portion of the frame and a compartment module system of the three-dimensional storage system of the present invention.

FIGS. 1 and 5 illustrate that a plurality of the compartment modules 76 of the compartment module system 14 are supported on the frame 12. In the illustrated example, the compartment module system 14 includes seven compartment modules 76 on one pair of tracks 28 along with three pairs of tracks 28 located in a line. Furthermore, each compartment module 76 includes fifteen vertically stacked compartments 16. However, it is contemplated that any number of compartment modules 76 could be located on one pair of tracks 28, any number of pairs of tracks 28 could be used and any number of vertically stacked compartments 16 in compartment modules 76 could be used.

In use, the three-dimensional storage system 10 is filled with products by placing the products into the compartments 16. Each compartment module 76 can be moved along the tracks 28 to allow a compartment module 76 located behind the front row of compartment modules 76 to be accessible. Products can be selectively removed from the compartments 16 of the three-dimensional storage system 10 in substantially the same manner as filling the compartments 16, but with removing the products from the compartments 16 instead of placing the products within the compartments 16.

FIG. 1 illustrates a front three-dimensional storage system 10 wherein the compartments 16 of the compartment modules 76 face an outside of the frame 12 such that the products are accessible from an aisle in front of the frame 12. FIG. 1 also illustrate a three-dimensional storage system 10 wherein the compartments 16 of the compartment modules 76 face adjacent compartments 16 of compartment modules 76 such that the products are accessible by forming an aisle between compartment modules 76 within the frame (called an "interior accessible three-dimensional storage system 10"). The interior accessible three-dimensional storage system 10 is illustrated at a rear of the system 10 in FIG. 1 (although such could also be at a front of the system 10). In the interior accessible three-dimensional storage system 10, the top connection members 86 of the compartment modules 76 can slide along bars instead of tracks. Therefore, instead of tracks 28, cylindrical bars extending from one side of the frame 12 to another can be used. Alternatively, the compartment modules 76 can be formed with the top connection members 86 and the roller bars can extend through tops of the side walls of the compartment modules 76. It is contemplated that each compartment module 76 could move on its own (e.g., by being connected to a pair of bars or having a roller bar being connected to a pair of tracks and only a single compartment module 76). It is also contemplated that a row of compartment modules could be connected together (by having each compartment module 76 share a side wall as discussed above) such that a row of the compartment modules move together. As illustrated in FIG. 1, the compartments 16 are accessible by forming an aisle 100 within the interior accessible three-dimensional storage system 10.

The reference numeral 10c (FIGS. 7-9) generally designates another embodiment of the present invention, having a second embodiment for the storage system. Since storage system 10c is similar to the previously described storage system 10, similar parts appearing in FIGS. 1-6 and FIGS. 7-9, respectively, are represented by the same, corresponding reference number, except for the suffix "c" in the numerals of the latter. The storage system 10c is similar to the storage system 10, except that the track support bars 32c are directly connected to the cross-beams 20c at ends of the track support bars 32c such that terminal ends of the track support bars 32c abut against the cross-beams 20c. It is contemplated that the track support bars 32c could be connected to the cross-beams 20c in any manner, such as by fasteners or by welding. Another difference is that the storage system 10c does not include a hook system 30, but the connection assemblies 44c directly connect the tracks 28c to the track support bars 32c. Moreover, the storage system 10c does not include locator members 48 (although it is contemplated that such locator members 48 could be used).

In the illustrated example, each connection assembly 44c includes a left hand connection assemblage and a right hand connection assemblage. The left hand connection assemblage is a mirror image of the right hand connection assemblage, such that only the left hand connection assemblage will be discussed herein. The left hand connection assemblage 44c includes a left hand C-shaped holding member 46c. The left hand C-shaped holding member 46c includes a side panel 60c, a top panel 62c and a bottom panel 64c. The top panel 62c rests on top of the track support bars 32c. The side panel 60c has an opening 66c therein, with the track support bar 32c extending through the opening 66c. The bottom panel 64c extends to the right from a bottom of the side panel 60c. The bottom panel 64c includes an upwardly extending lip 68c at an end thereof for maintaining the track 28c in position.

Figure 7:
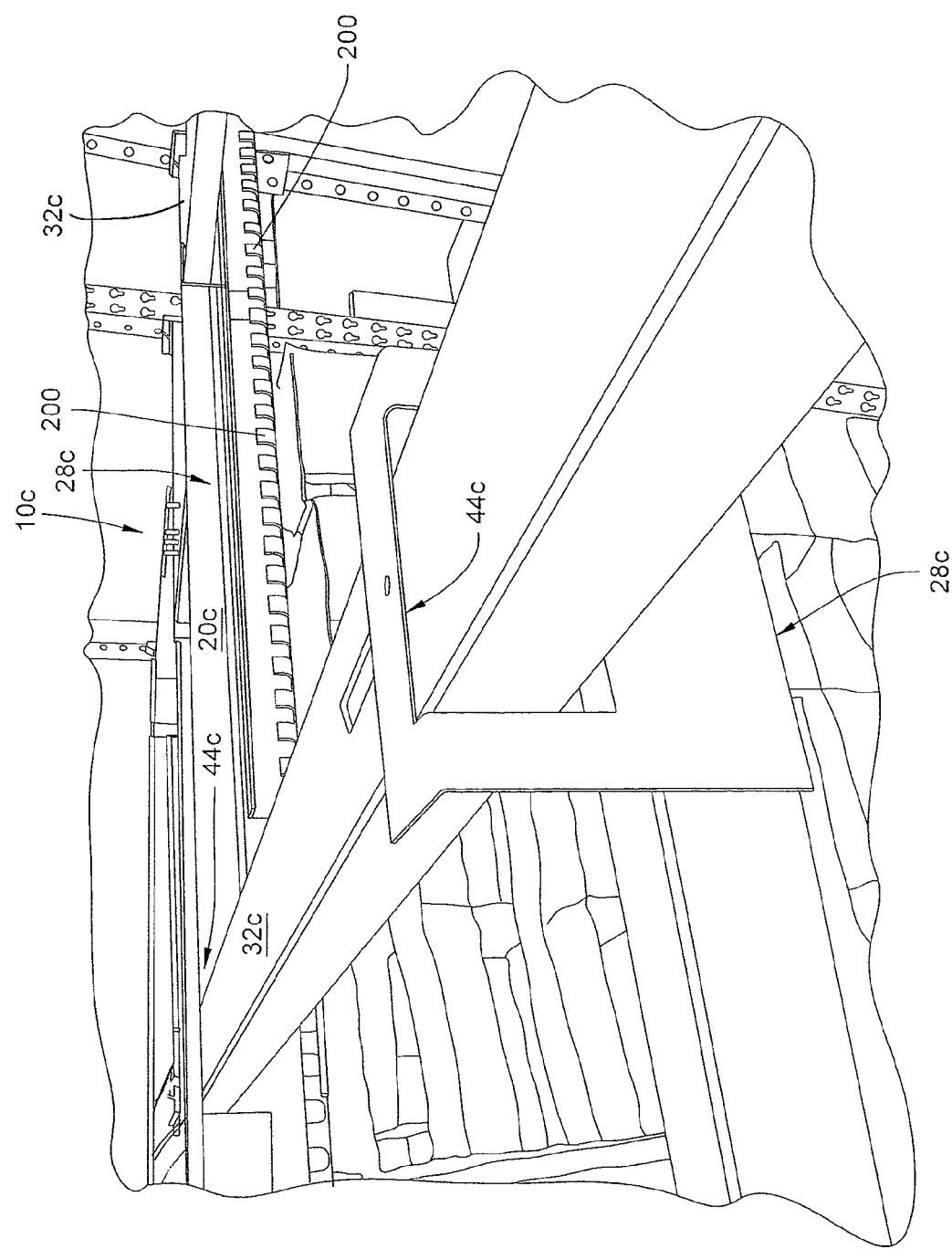
FIG. 7 is a perspective view of another embodiment of the three-dimensional storage system.
Figure 10:
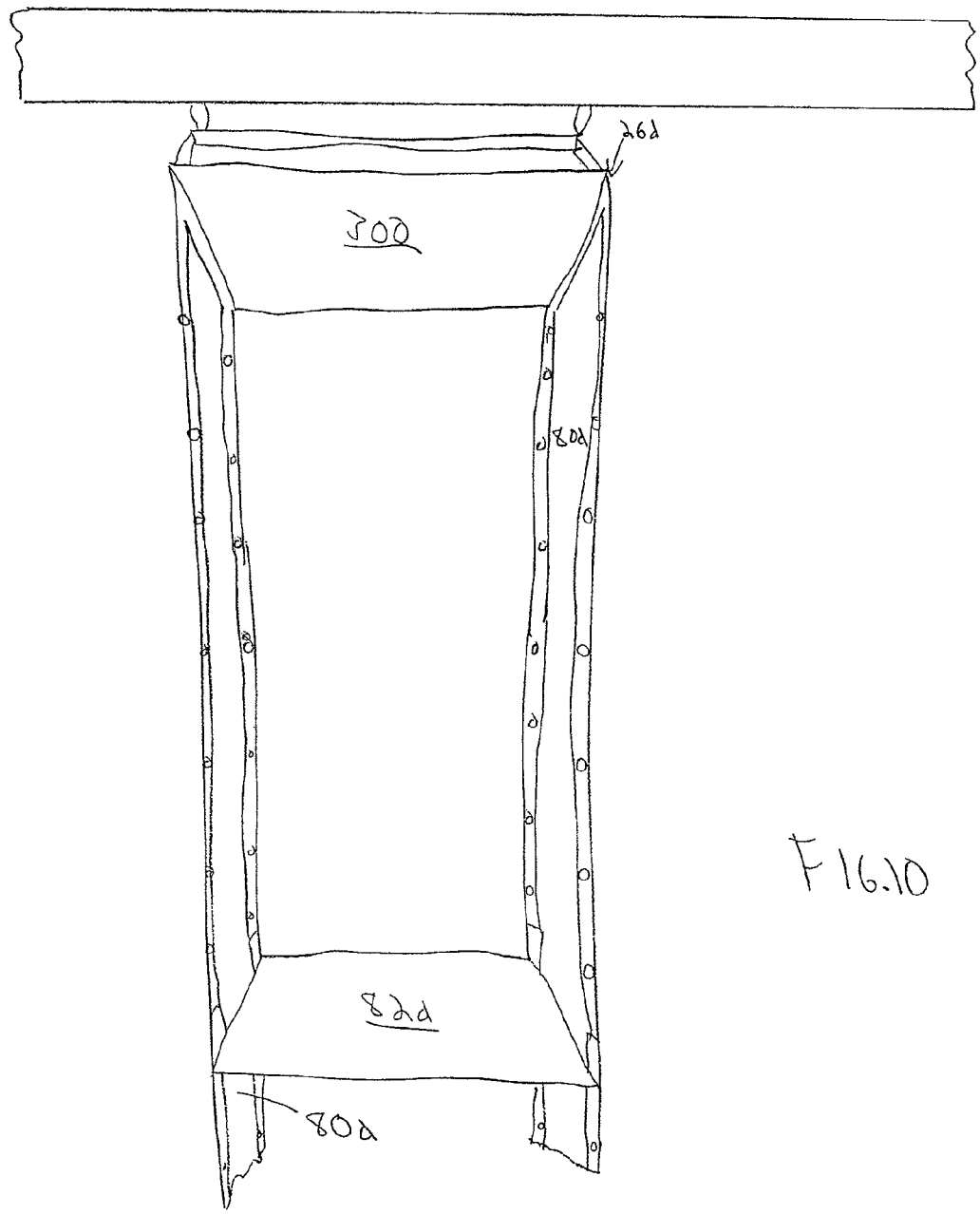
FIG. 10 is a front perspective view of a second embodiment for the compartment assembly of the present invention.

The illustrated connection assembly 44c can support the tracks 28 as discussed above and shown in FIGS. 3-5 (with the associated roller bars 78) or can support modified tracks 28c. The modified tracks are illustrated in FIGS. 7-9. Instead of supporting roller bars 78 as in the first embodiment of the tracks 28, the modified tracks 28c include a plurality of notches 200 in the upwardly extending lip 68c. Aligned notches 200 in left hand and right hand assemblages 44c are configured to accept a bar 78c (without rollers) therein. The bar 78c supports the compartment assembly 26c, but at discrete locations defined by aligned pairs of notches 200 instead of being infinitely adjustable. The bar 78c is moved by lifting the bar 78c out of a first pair of aligned notches 200 and then lowering the bar 78c into another set of aligned notches 200. The notches 200 can prevent unintentional movement of the bar 78 and compartment assembly 26c.

The reference numeral 26d (FIGS. 10-19) generally designates another embodiment of the present invention, having a second embodiment for the compartment assembly. Since compartment assembly 26d is similar to the previously described compartment assembly 26, similar parts appearing in FIGS. 1-6 and FIGS. 10-19, respectively, are represented by the same, corresponding reference number, except for the suffix "d" in the numerals of the latter. The compartment system 26d can be used with any of the systems described above (e.g., the system 10 described in association with FIGS. 1-6 or the system 10c described in association with FIGS.

7-9). The compartment system 26d comprises an adjustable, disconnectable system having a top 300, side walls 80d and shelves 82d. The top 300, the side walls 80d and the shelves 82 are all removable from each other.

In the illustrated embodiment, the top 300 (FIG. 11-14) of the compartment system 26d is configured to be connected to the roller bars 78 or the bars 78c discussed above. The top 300 includes a top plate 302 and a pair of connection members 304. The connection members 304 are each connected to opposite sides of the top plate 302. Each connection member 304 includes a pair of loops 306 for accepting the roller bars 78 or the bars 78c. A single roller bar 78 or bar 78c extends through one of the loops 306 in each connection member 304. It is contemplated that the connection member can be made of any material (e.g., metal, plastic or fabric). The top plate 302 can be made of any material, but preferably is rigid (e.g., metal, plastic, corrugated paper or a sleeve of fabric having any of these materials therein). The top plate 302 has a first portion 310 (comprising teeth) of a zipper on opposite sides thereof. It is contemplated that each side of the top plate 302 could have a slider 314 of the zipper thereon or that only one side could have the slider 314 of the zipper. In the illustrated embodiment, only one side of the top plate 302 includes the slider 314. The side walls 80d are removably connected to the top plate 302.

The illustrated side walls 80d (FIGS. 15-17) each include a second portion 320 (comprising teeth) of the zipper at top and bottom ends thereof. In the illustrated embodiment, each side wall 80d includes a slider 322 on teeth at a first end thereof and only teeth at a second end thereof. With such a side wall 80d, a single configuration of the side wall 80d can be connected to each side of the top plate 302 of the top 300. The first end of the side wall 80d (i.e., the end with the slider 322) can be connected to the side of the top plate 302 of the top 300 without a slider. An identical side wall 80d can be flipped such that the second end of the second side wall 80d (i.e., the end without the slider) can be connected to the side of the top plate 302 of the top 300 with the slider 314. Alternatively, it is contemplated that left and right hand side walls 80d can be made with either the top plate 302 of the top 300 having two sides having sliders of the zippers or the top of the left and right hand side walls 80d can include sliders. The side walls 80d include reinforced front and rear areas 330 having a plurality of aligned first portions 334 of snap fasteners, with the shelves 82d including second portions 332 of the snap fasteners. However, it is contemplated that the front and rear areas 330 do not have to be reinforced. The side walls 80d can be made of any material (e.g., metal, plastic or fabric).

In the illustrated embodiment, the shelves 82d (FIGS. 18 and 19) are removably snapped onto the side walls 80d of the compartment system 26d. The shelves 82d include a bottom plate 336 and upstanding side flanges 338. The side flanges 338 include the second portions 334 of the snap fasteners extending outwardly. The bottom plate 336 can be made of any material, but preferably is rigid (e.g., metal, plastic, corrugated paper or a sleeve of fabric having any of these materials therein).

The illustrated compartment system 26d is formed by first connecting the top 300 to the roller bars 78 or the bars 78c discussed above. The side walls 80d are then connected to the top 300 by zipping the zippers using the sliders discussed above. Then shelves 82d are then connected to the side walls 80c by connecting aligned snap fasteners on the shelves 82d with those on the side walls 80c. It is contemplated that other fasteners could be used instead of snap fasteners (e.g., hook and loop type fasteners, zippers, etc.) Furthermore, it is contemplated that other fasteners could be used instead of zippers (e.g., snap fasteners, hook and loop type fasteners, etc.) The width and depths of the top 300 and the shelves 82c can be chosen by a user of the system and it is contemplated that a system could be sold with a variety of tops 300 and shelves 82d having different widths and/or depths. Furthermore, the length and depth of the side walls 80c can be chosen by a user of the system and it is contemplated that a system could be sold with a variety of side walls 80c having different widths and/or depths. Moreover, the vertical spacing of the first portions 334 of the snap fasteners on the side walls 80c can be chosen by a user of the system. It is contemplated that a system could be sold with a variety of side walls 80c having different vertical spacing of the first portions 334 of the snap fasteners.

The reference numeral 26e (FIGS. 20-22) generally designates another embodiment of the present invention, having a third embodiment for the compartment assembly. Since compartment assembly 26e is similar to the previously described compartment assembly 26, similar parts appearing in FIGS. 1-6 and FIGS. 20-22, respectively, are represented by the same, corresponding reference number, except for the suffix "e" in the numerals of the latter. The compartment system 26e can be used with any of the systems described above (e.g., the system 10 described in association with FIGS. 1-6 or the system 10c described in association with FIGS. 7-9). The compartment system 26e includes fabric side wall 8e and rigid shelves 80e that allow the compartment system 26e to fold easily like an accordion.

The reference numeral 26f (FIGS. 23-25) generally designates another embodiment of the present invention, having a fourth embodiment for the compartment assembly. Since compartment assembly 26f is similar to the previously described compartment assembly 26d, similar parts appearing in FIGS. 10-19 and FIGS. 23-25, respectively, are represented by the same, corresponding reference number, except for the suffix "f" in the numerals of the latter. The compartment system 26f can be used with any of the systems described above (e.g., the system 10 described in association with FIGS. 1-6 or the system 10c described in association with FIGS. 7-9). The compartment system 26f includes hook and loop type fasteners 500 instead of the snap fasteners.

The reference numeral 10d (FIGS. 26-31) generally designates another embodiment of the present invention, having another embodiment for the storage system. The storage system 10d allows for placement of any of the compartment assembly 26-26f noted above in an aisle in front of or behind the frame 12. The frame 12 includes the posts 18 and horizontal cross beams 20 as described above. The cross beams 20 include a plurality of the cross beams 20 extending parallel and inside of a rectangular periphery defined by the posts 18. Each of the parallel cross beams 20 have a bracket 600 (FIGS. 28-31) connected thereto. The brackets 600 are configured to receiving the parallel cross beams 20 therein along with receiving and carrying a plurality of extended beams 602. The extended beams 602 extend outside of the rectangular periphery defined by the posts 18. The brackets 600 carry one of the tracks 28, 28c on a bottom end thereof. Ends of the extended beams 602 extending outside of the rectangular periphery defined by the posts 18 carry connection assemblies 44, 44a, 44b or 44c thereon for supporting tracks 28, 28c in an aisle in front of or behind the frame 12.

In the illustrated example, the brackets 600 include a vertical plate 604, a top flange 606 extending in a first direction and a bottom hook 608 extending in the first direction. The bottom hook 608 is configured to support the connection assemblies 44, 44a, 44b or 44c thereon. The parallel cross beams 20 extending inside of the rectangular periphery defined by the posts 18 extending through a top opening 610 in the vertical plate 604 directly under the top flange 606. The top flange 606 rests on top of the beams 20 and is configured to be fixedly connected to the beams 20 by inserting a fastener through the top flange 606 and into the beams 20. The extended beams 20 extending through a bottom opening 612 in the vertical plate 604. A support flange 614 extends in a second direction directly below the bottom opening 612. The support flange 614 supports the extended beam 20 and is configured to be fixedly connected to the extended beams 20 by inserting a fastener through the support flange 614 and into the extended beam 20.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. A track shelving system comprising:
a frame having a plurality of vertical posts and a plurality of horizontal beams supported by the vertical posts;
a support assembly comprising a plurality of brackets supported by the horizontal beams and a plurality of tracks, with each of the plurality of tracks being engaged with at least two of the brackets;
a shelving assembly comprising a pair of vertical walls, a top wall, and a plurality of horizontal shelves attached to the pair of vertical walls, the top wall being connected to top edges of the vertical walls;
the shelving assembly including a pair of rods connected to the top wall by straps, the pair of rods being configured to be moved along the tracks to allow the shelving assembly to be moved to a selected horizontal position;
wherein the horizontal beams include cross beams and connector beams, the connector beams being connected to the vertical posts, and the cross beams extending between and being connected to the connector beams; and
wherein each of the brackets comprises a vertical plate having a top opening receiving one of the cross beams therethrough.

2. The track shelving system of claim 1, wherein:
the brackets are connected to the cross beams.

3. The track shelving system of claim 1, wherein:
the vertical plate of each of the brackets further comprises a bottom opening receiving an extension beam therethrough, the extension beams extending outside of a rectangular periphery defined by the vertical posts.

4. The track shelving system of claim 3, wherein:
the vertical plate of each of the brackets includes a support flange extending from a side face of the vertical plate at a bottom edge of the bottom opening, the support flange supporting the extension beam thereon.

5. The track shelving system of claim 1, wherein:
the vertical plate of each of the brackets includes a curved hook at a bottom thereof for supporting one of the tracks thereon.

6. The track shelving system of claim 1, wherein:
the rods have wheels on opposite ends thereof, with the wheels being configured to roll on the tracks.

7. The track shelving system of claim 1, wherein:
each of the tracks have a plurality of notches, with the tracks including at least one opposed pair of tracks, and each of the rods is configured to be selectively positioned in an aligned pair of the notches.

8. The track shelving system of claim 1, wherein:
the horizontal shelves and the top wall are rigid.

9. The track shelving system of claim 1, wherein:
the vertical walls are made of flexible material.

10. The track shelving system of claim 9, wherein:
the horizontal shelves and the top wall are rigid.

11. The track shelving system of claim 1, wherein:
zippers connect the top wall to each of the vertical walls.

12. The track shelving system of claim 1, wherein:
each of the straps comprise a strip of material having ends thereof connected to opposite edges of the top wall and a pair of loops, each rod extending through aligned loops of separate ones of the straps.

13. The track shelving system of claim 1, wherein:
the horizontal shelves are removably attached to the pair of vertical walls such that each of the horizontal shelves is able to be positioned in a plurality of vertical positions on the pair of vertical walls.

14. The track shelving system of claim 13, wherein:
the vertical walls include a plurality of sets of horizontally aligned buttons, with the horizontal shelves being configured to be connected to one of the sets of horizontally aligned buttons.

15. The track shelving system of claim 14, wherein:
each set of horizontally aligned buttons includes four buttons.

16. The track shelving system of claim 14, wherein:
the vertical walls include vertically extending reinforced strips adjacent opposite vertical edges thereof, with the buttons being located on the reinforced strips.

17. The track shelving system of claim 13, wherein:
each of the horizontal shelves comprises a bottom plate and a plurality of upstanding side flanges having connection members thereon, the connection members being configured to removeably connect the horizontal shelves to the vertical walls.

18. The track shelving system of claim 17, wherein:
the connection members comprise outwardly extending buttons.

19. The track shelving system of claim 13, wherein:
each of the horizontal shelves comprises a rigid plate having a first one of a hook and loop type fastener thereon;
the vertical walls have at least one vertically extending strip of a second one of the hook and loop type fastener, thereby allowing the horizontal shelves to be selectively and vertically positioned on the vertical walls.

20. A track shelving system comprising:
a frame having a plurality of vertical posts and a plurality of horizontal beams supported by the vertical posts;
a support assembly comprising a plurality of brackets supported by the horizontal beams and a plurality of tracks, with each of the plurality of tracks being engaged with at least two of the brackets;
a shelving assembly comprising a pair of vertical walls of flexible fabric, a top wall, and a plurality of rigid horizontal shelves fixedly attached to the pair of vertical walls, the top wall being connected to top edges of the vertical walls;
the shelving assembly including a pair of rods connected to the top wall by straps, the pair of rods being configured to be moved along the tracks to allow the shelving assembly to be moved to a selected horizontal position;
wherein the horizontal beams include cross beams and connector beams, the connector beams being connected to the vertical posts, and the cross beams extending between and being connected to the connector beams; and wherein each of the brackets comprises a vertical plate having a top opening receiving one of the cross beams therethrough.

21. The track shelving system of claim 20, wherein:
the brackets are connected to the cross beams.

22. The track shelving system of claim 20, wherein:
the vertical plate of each of the brackets further comprises a bottom opening receiving an extension beam therethrough, the extension beams extending outside of a rectangular periphery defined by the vertical posts.

23. The track shelving system of claim 22, wherein:
the vertical plate of each of the brackets includes a support flange extending from a side face of the vertical plate at a bottom edge of the bottom opening, the support flange supporting the extension beam thereon.

24. The track shelving system of claim 20, wherein:
the vertical plate of each of the brackets includes a curved hook at a bottom thereof for supporting one of the tracks thereon.

25. The track shelving system of claim 20, wherein:
the rods have wheels on opposite ends thereof, with the wheels being configured to roll on the tracks.

26. The track shelving system of claim 20, wherein:
each of the tracks have a plurality of notches, with the tracks including at least one opposed pair of tracks, and each of the rods is configured to be selectively positioned in an aligned pair of the notches.

27. A track shelving system comprising:
a frame having a plurality of vertical posts and a plurality of horizontal beams supported by the vertical posts;
a support assembly comprising a plurality of brackets supported by the horizontal beams and a plurality of tracks, with each of the plurality of tracks being engaged with at least two of the brackets;
a shelving assembly comprising a pair of vertical walls, a top wall, and a plurality of horizontal shelves attached to the pair of vertical walls, the top wall being connected to top edges of the vertical walls;
the shelving assembly including a pair of rods connected to the top wall by straps, the pair of rods being configured to be moved along the tracks to allow the shelving assembly to be moved to a selected horizontal position;
wherein the horizontal beams include cross beams and connector beams, with the connector beams being directly connected to and engaged with the vertical posts, and with the cross beams extending between and being directly connected to and engaged with the connector beams.

28. The track shelving system of claim 27, wherein:
the brackets are directly engaged with the cross beams.

29. The track shelving system of claim 27, wherein:
each of the brackets comprises a vertical plate having a top opening receiving one of the cross beams therethrough.

30. The track shelving system of claim 27, wherein:
the shelves are rigid.

31. The track shelving system of claim 27, wherein:
the vertical walls are made of flexible fabric.

32. A track shelving system comprising:
a frame having a plurality of vertical posts and a plurality of horizontal beams supported by the vertical posts, the horizontal beams including cross beams and connector beams, the connector beams being directly connected to and engaged with the vertical posts, and the cross beams extending between and being directly connected to and engaged with the connector beams;
a support assembly comprising a plurality of brackets supported by the horizontal beams and a plurality of tracks, with each of the plurality of tracks being engaged with at least two of the brackets;
a shelving assembly comprising a pair of vertical walls, a top wall, and a plurality of horizontal shelves attached to the pair of vertical walls, the top wall being connected to top edges of the vertical walls;
the shelving assembly including a pair of rods connected to the shelving assembly, the pair of rods being configured to be moved along the tracks to allow the shelving assembly to be moved to a selected horizontal position;
wherein the vertical posts define a horizontal periphery and the cross beams extending outside of the horizontal periphery.

* * * * *